US006546552B1

(12) United States Patent
Peleg

(10) Patent No.: US 6,546,552 B1
(45) Date of Patent: Apr. 8, 2003

(54) DIFFERENCE EXTRACTION BETWEEN TWO VERSIONS OF DATA-TABLES CONTAINING INTRA-REFERENCES

(75) Inventor: Sharon Peleg, Ramat Hasharon (IL)

(73) Assignee: Red Bend Ltd., Ramat Hasharon (IL)

( * ) Notice: Subject to any disclaimer, the term of this patent is extended or adjusted under 35 U.S.C. 154(b) by 0 days.

(21) Appl. No.: 09/376,512

(22) Filed: Aug. 18, 1999

(30) Foreign Application Priority Data

Aug. 19, 1998 (IL) .................................................. 125846

(51) Int. Cl.[7] ................................................ G06F 9/45
(52) U.S. Cl. .................................................... 717/170
(58) Field of Search .................................... 717/11, 170

(56) References Cited

U.S. PATENT DOCUMENTS

| | | | | |
|---|---|---|---|---|
| 5,155,847 A | * | 10/1992 | Kirouac et al. ................. | 717/11 |
| 5,359,730 A | * | 10/1994 | Marron .......................... | 709/100 |
| 5,752,039 A | * | 5/1998 | Tanimura ...................... | 707/203 |
| 5,761,649 A | * | 6/1998 | Hill ............................... | 705/27 |
| 5,790,760 A | * | 8/1998 | Arima ........................... | 706/45 |
| 5,815,704 A | * | 9/1998 | Shimotsuji et al. ........... | 382/190 |
| 5,832,520 A | * | 11/1998 | Miller ........................... | 707/203 |
| 6,367,075 B1 | * | 4/2002 | Kruger et al. ................. | 717/169 |

FOREIGN PATENT DOCUMENTS

| | | | | |
|---|---|---|---|---|
| EP | 0 472 812 A | | 3/1992 | ............. G06F/9/45 |
| JP | 4-242829 | * | 8/1992 | ............. G06F/9/06 |
| JP | 5-091550 | * | 4/1993 | ............. G06F/9/06 |

| | | | | |
|---|---|---|---|---|
| WO | WO 93/00633 | | 1/1993 | ........... G06F/11/34 |
| WO | WO 97/12508 | | 4/1997 | ........... G06F/11/00 |

OTHER PUBLICATIONS

Horwitz, Identifying the Semantic and Textual Differences Between Two Versions of a Program, ACM, pp. 234–245.*
International Search Report for PCT/IL99/00446, dated Dec. 12, 1999 (3 pages).
Coppieters, K.: "A Cross–Platform Binary Diff", Dr. Dobb's Journal, US, San Mateo, California, pp. 32, 35–36, XP 000610668.

* cited by examiner

Primary Examiner—Gregory Morse
Assistant Examiner—John Q. Chavis
(74) Attorney, Agent, or Firm—Fitch, Even, Tabin, & Flannery

(57) ABSTRACT

A method for generating a compact difference result between an old program and a new program. Each program including reference entries that contain reference that refer to other entries in the program. The method includes the steps of scanning the old program and for each reference entry perform steps that include replacing the reference of the entry by a distinct label mark, whereby a modified old program is generated. There is further provided the step of scanning the new program and for each reference entry perform steps that include replacing the reference of the entry by a distinct label mark, whereby a modified new program is generated. There is still further provided the step of generating the specified difference result utilizing directly or indirectly the modified old program and modified new program.

68 Claims, 4 Drawing Sheets

DIFFERENCE EXTRACTION BETWEEN TWO VERSIONS OF DATA-TABLES CONTAINING INTRA-REFERENCES

FIELD OF THE INVENTION

This invention relates generally to updating computer programs.

BACKGROUND OF THE INVENTION

With the ever increasing use of remote communication and in particular the Internet, new applications have been introduced such as commercial trade over the Internet, electronic supermarkets, distribution of computer products over the Internet, and others.

Both the popularity and availability of access to the Internet for common users have encouraged not only the distribution of products, but also the upgrade and update of the product under question from a remote site, using, to this end, the Internet infra-structure.

Turning to a specific example of computer programs, an old program is installed at a remote client site and is subject to be upgraded to a new program, where the latter includes some modifications as compared to the old program.

In order to catty out the update at the remote client site (through the network), the provider should, preferably, generate a difference result representative of the difference between the old program and the new program, and send the resulting file through the Internet to the remote client site. The client, in turn, invokes appropriate utility, which incorporates the differences in the old program, thereby generating the desired new program at the client site, The specified procedure caries the obvious advantages in that on the one band, the provider does not need to be present at the client site and, on the other hand, only the difference result and not the entire new program is sent to the client. Assuming, for example, that a modified Office '97 package (commercially available from Microsoft Inc. USA) should be sent to clients, since the compressed size of programs of the package occupies ten of Mega-bytes, and, further considering the relatively low throughput of the Internet and the bottleneck of the modem throughput at the client end (say an average of 33,600 bps), it is easy to understand that transmitting the entire new package through the network is practically infeasible.

Normally, the volume of the difference result is significantly smaller than that of the raw new program and, accordingly, sending only the difference result data rather than the entire new program, is more efficient. This notwithstanding, and as will be explained in greater detail below, applying known per se file difference applications (such as techniques utilized by diff utilities of the UNIX operating systems or a similar diff utility of the GNU project from FSF) in order to generate a difference result between the old program and the new program, normally results in a relatively large amount of data, even if the modifications that were introduced to the old program (in order to generate the new program) are very few. Thus, consider, for example, an old program where few new instructions are inserted and few others are deleted in order to bring about the new program. The difference result between, the old program and the new program will not only reveal the inserted and deleted instructions, but also all those entries that jump, jump on condition, call functions, reference to data and possibly others (referred to, collectively, as reference entries—see glossary below) which, by nature, specify a target address (reference) as an integral part of the command. The latter addresses may have been changed due to the fact that some instructions were added and others deleted. It is important to note that the reference entries that are modified are not those that were inserted, and obviously not those that were deleted. In fact, insertion of only one new entry may result in the plurality of altered reference entries which will naturally be reflected in the difference result and obviously will inflate its volume.

It is accordingly appreciated that despite the fact that the actual change between the old and new program is very limited, the resulting file difference is relatively large. The same problem is encountered in other applications, which employ data tables (see Glossary below), that are structured like a program, and are subject to updates in the manner specified.

There is accordingly a need in the art to provide for an efficient tool which will result in significantly smaller volumes of difference results between old programs and new programs, as compared to hitherto known techniques for accomplishing difference result. The proposed tool is useful for various applications including, but not limited to, incremental software updates and version control.

There is yet another need in the art to provide for an efficient tool which will result in significantly smaller volumes of difference results between old data tables and new data tables.

GLOSSARY

There follows a glossary of terms, some of which are conventional and others have been coined:

Data Table—a table of entries, each may have a different size;

Entry—a data fable includes entries, each of which is an addressable unit that contains data;

Address—a number which is uniquely assigned to a single entry by which that entry is accessed; In the following description, the terms entry and address are occasionally used interchangeably.

Reference—a part of the data appearing in an entry in the data table which is used to refer to some other entry from the same data table. A reference can be either an address or a number used to compute an address. Entries that include references are designated also as reference entries.

Label—an abstract notation of an entry which is referred by another entry of the same data table through a reference.

Old Data Table—a data table (or portion of a data table) that is to be updated (possibly from remote site) so as to generate a new data table (or portion of a new data table). Insofar as remote update is concerned, it is normally, although not necessarily, transmitted through a communication network such as the Internet. It should be noted that whilst for convenience of explanation only, the description focuses predominately on the Internet, the invention is by no means bound by this specific example.

As an example, a data table can be an executable program either as a loaded program in machine-memory or as an executable-file. In this example, entries are individual machine instructions of the program or the individual data elements used by the program.

Instructions and data elements of a program may contain addresses to other instructions or data elements and are regarded as references. Such references can be detected by a process of disassembly applied on the program or, if given, by analyzing a relocation table attached to executable programs by link-editors that create them.

Another example of a data table is a group of inter-linked data records stored in an array of bytes where records contain addresses of other data records. The format of the records and the way they are laid out in the array are known, and the analysis and decomposition of such array is possible.

Old program—an example of old data table: a program (or portion of a program) that is to be updated so as to generate a new program (or portion of a program).

It should be further noted that reference to the old program and the new program is made for convenience of explanation only, and encompasses inter alia the upgrade of the old program to the new program (e.g. due to an upgrade in versions), modifications of the old program to the new program, (e.g. due to corrections of bugs in the old program), and changing from a first old program to a second (and possibly different) new program;

SUMMARY OF THE INVENTION

For convenience of explanation, the invention is described with reference to a specific example of computer programs. The invention is by no means bound by this particular example.

As explained above, applying a known per se file difference utility to an old program and a new program normally results in a relatively large amount of data, even if the modifications that were introduced to the old program (in order to generate the new program) are very few. The present invention is based on the observation that the relatively large size of the difference result stems from the alterations of reference in reference entries as a result of other newly inserted entries (and/or entries that were deleted).

On the basis of this observation, the invention aims at generating a modified old program and a modified new program, wherein the difference in references in corresponding entries in said new and old programs as explained above, will be reflected as invariant entries in the modified old and new programs. The net effect is that the invariant reference entries (between the modified old program and the modified new program), will not appear in the difference result, thereby reducing its size as compared to a conventional difference result obtained by using hitherto known techniques.

Accordingly, the invention provides for a method for generating a compact difference result between an old program and a new program; each program including reference entries that contain reference that refer to other entries in the program; the method comprising the steps of:

(a) scanning the old program and for substantially each reference entry perform steps that include:
  (i) replacing the reference of said entry by a distinct label mark, whereby a modified old program is generated;
(b) scanning the new program and for substantially each reference entry perform steps that include:
  (i) replacing the reference of said entry by a distinct label mark, whereby a modified new program is generated;
(c) generating said difference result utilizing directly or indirectly at least said modified old program and modified new program.

The invention further provides for a method for performing an update in an old program so as to generate a new program; each program including reference entries that contain reference that refer to other entries in the program; the method comprising the steps of:

(a) receiving data that includes a compact difference result; said compact difference result was generated utilizing a modified old program and a modified new program;
(b) scanning the old program and for substantially each reference entry perform, steps that include:
  (i) replacing the reference of said entry by a distinct label mark, whereby the modified old program is generated;
(c) reconstituting the modified new program utilizing at least said compact difference result and said modified old program; said modified new program is differed from said new program at least in that substantially each reference entry in said new program is replaced in said modified new program by a distinct label mark;
(d) reconstituting said new program utilizing directly or indirectly at least said compact difference result and said modified new program.

Still further, the invention provides for a method for generating a compact difference result between an old program, and a new program; each program including reference entries that contain reference that refer to other entries in the program; the method comprising the steps of:

(a) generating a modified old program utilizing at least said old program;
(b) generating a modified new program utilizing at least said new program, said modified old program and modified new program have at least the following characteristics:
  (i) substantially each reference in an entry in said old program that is different than corresponding entry in said new program due to delete/insert modifications that form part of the transition between said old program and new program are reflected as invariant references in the corresponding entries in said modified old and modified new programs;
(c) generating said compact difference result utilizing at least said modified new program and modified old program.

Yet further, the invention provides for a method for performing an update in an old program so as to generate a new program; each program including reference entries that contain reference that refer to other entries in the program; the method comprising the steps of:

(a) receiving data that includes a compact difference result; said compact difference result was generated utilizing a modified old program and a modified new program;
(b) generating a modified old program utilizing at least said old program;
(c) reconstituting a modified new program utilizing directly or indirectly at least said modified old program and said compact difference result; said modified old program and modified new program have at least the following characteristics:
  (i) substantially each reference in an entry in said old program that is different than corresponding entry in said new program due to delete/inset modifications that form part of the transition between said old program and new programs are reflected as invariant references in the corresponding entries in said modified old and modified new programs;

(d) reconstituting said new program utilizing directly or indirectly at least said compact difference result and said modified new program.

According to another aspect, the invention provides for a system for generating a compact difference result between an old program and a new program; each program including reference entries that contain reference that refer to other entries in the program; the system comprising a processing device capable of:
  (a) scanning the old program and for substantially each reference entry perform steps that include:
    (i) replacing the reference of said entry by a distinct label mark, whereby a modified old program is generated;
  (b) scanning the new program and for substantially each reference entry perform steps that include:
    (i) replacing the reference of said entry by a distinct label mark, whereby a modified new program is generated;
  (c) generating said difference result utilizing directly or indirectly at least said modified old program and modified new program.

Still further, the invention provides for a system for performing an update in an old program so as to generate a new program; each program including reference entries that contain reference that refer to other entries in the program; the system comprising a processing device capable of:
  (a) receiving data that includes a compact difference result; said compact difference result was generated utilizing a modified old program and a modified new program;
  (b) scanning the old program and for substantially each reference entry perform steps that include:
    (i) replacing the reference of said entry by a distinct label mark, whereby the modified old program is generated;
  (c) reconstituting the modified new program utilizing at least said compact difference result and said modified old program; said modified new program is differed from said new program at least in that substantially each reference entry in said new program is replaced in said modified new program by a distinct label mark;
  (d) reconstituting said new program utilizing directly or indirectly at least said compact difference result and said modified new program.

The invention further provides for a system for generating a compact difference result between an old program and a new program; each program including reference entries that contain reference that refer to other entries in the program; the system comprising a processing device capable of:
  (a) generating a modified old program utilizing at least said old program;
  (b) generating a modified new program utilizing at least said new program, said modified old program and modified new program have at least the following characteristics:
    (i) substantially each reference in an entry in said old program that is different than corresponding entry in said new program due to delete/insert modifications that form part of the transition between said old program and new program are reflected as invariant references in the corresponding entries in said modified old and modified new programs;
  (c) generating said compact difference result utilizing at least said modified new program and modified old program.

Still further, the invention provides for a system for performing an update in an old program so as to generate a new program; each program including reference entries that contain reference that refer to other entries in the program; the system comprising a processing device capable of:
  (a) receiving data that includes a compact difference result; said compact difference result was generated utilizing a modified old program and a modified new program;
  (b) generating a modified old program utilizing at least said old program;
  (c) reconstituting a modified new program utilizing directly or indirectly at least said modified old program and said compact difference result; said modified old program and modified new program have at least the following characteristics:
    (i) substantially each reference in an entry in said old program that is different than corresponding entry in said new program due to delete/inset modifications that form part of the transition between said old program and new program are reflected as invariant references in the corresponding entries in said modified old and modified new programs;
  (d) reconstituting said new program utilizing directly or indirectly at least said compact difference result and said modified new program.

Yet further, the invention provides for a method for generating a compact difference result between an old data table and a new data table; each data table including reference entries that contain reference that refer to other entries in the data table; the method comprising the steps of:
  (a) scanning the old data table and for substantially each reference entry perform steps that include:
    (i) replacing the reference of said entry by a distinct label mark, whereby a modified old data table is generated;
  (b) scanning the new data table and for substantially each reference entry perform steps that include:
    (i) replacing the reference of said entry by a distinct label mark, whereby a modified new data table is generated;
  (c) generating said difference result utilizing directly or indirectly at least said modified old data table and modified new data table.

Moreover, the invention provides for a method for performing an update in an old data table so as to generate a new data table; each data table including reference entries that contain reference that refer to other entries in the data table; the method comprising the steps of:
  (a) receiving data that includes a compact difference result; said compact difference result was generated utilizing a modified old data table and a modified new data table;
  (b) scanning the old data table and for substantially each reference entry perform steps that include:
    (i) replacing the reference of said entry by a distinct label mark, whereby the modified old data table is generated;
  (c) reconstituting the modified new data table utilizing at least said compact difference result and said modified old data table; said modified new data table is differed from said new data table at least in that substantially each reference entry in said new data table is replaced in said modified new data table by a distinct label mark;
  (d) reconstituting said new data table utilizing directly or indirectly at least said compact difference result and said modified new data table.

The invention her provides for a method for generating a compact difference result between an old data table and a new data table; each data table including reference entries that contain reference that refer to other entries in the data table; the method comprising the steps of:

(a) generating a modified old data table utilizing at least said old data table;

(b) generating a modified new data table utilizing at least said new data table, said modified old data table and modified new data table have at least the following characteristics:

(i) substantially each reference in an entry in said old data table that is different than corresponding entry in said new data table due to delete/insert modifications that form part of the transition between said old data table and new data table are reflected as invariant references in the corresponding entries in said modified old and modified new data tables;

(c) generating said compact difference result utilizing at least said modified new data table and modified old data table.

The invention provides for a method for performing an update in an old data table so as to generate a new data table; each data table including reference entries that contain reference that refer to other entries in the data table; the method comprising the steps of:

(a) receiving data that includes a compact difference result; said compact difference result was generated utilizing a modified old data table and a modified new data table;

(b) generating a modified old data table utilizing at least said old data table;

(c) reconstituting a modified new data table utilizing directly or indirectly at least said modified old data table and said compact difference result; said modified old data table and modified new data table have at least the following characteristics:

(i) substantially each reference in an entry in said old data table that is different than corresponding entry in said new data table due to delete/inset modifications that form part of the transition between said old data table and new data table are reflected as invariant references in the corresponding entries in said modified old and modified new data tables;

(d) reconstituting said new data table utilizing directly or indirectly at least said compact difference result and said modified new data table.

The invention further provides for a system for generating a compact difference result between an old data table and a new data table; each data table including reference entries that contain reference that refer to other entries in the data table; the system comprising a processing device capable of:

(a) scanning the old data table and for substantially each reference entry perform steps that include:

(i) replacing the reference of said entry by a distinct label mark, whereby a modified old data table is generated;

(b) scanning the new data table and for substantially each reference entry perform steps that include:

(i) replacing the reference of said entry by a distinct label mark, whereby a modified new data table is generated;

(c) generating said difference result utilizing directly or indirectly at least said modified old data able and modified new data table.

Still further, the invention provides for a system for performing an update in an old data table so as to generate a new data table; each data table including reference entries that contain reference that refer to other entries in the data table; the system comprising a processing device capable of:

(a) receiving data that includes a compact difference result; said compact difference result was generated utilizing a modified old data table and a modified new data table;

(b) scanning the old data table and for substantially each reference entry perform steps that include:

(i) replacing the reference of said entry by a distinct label mark, whereby the modified old data table is generated;

(c) reconstituting the modified new data table utilizing at least said compact difference result and said modified old data table; said modified new data table is differed from said new data table at least in that substantially each reference entry in said new data table is replaced in said modified new data table by a distinct label mark;

(d) reconstituting said new data table utilizing directly or indirectly at least said compact difference result and said modified new data table.

Moreover, the invention provides for a system for generating a compact difference result between an old data table and a new data table; each data table including reference entries that contain reference that refer to other entries in the data table; the system comprising a processing device capable of:

(a) generating a modified old data table utilizing at least said old data table;

(b) generating a modified new data table utilizing at least said new data table, said modified old data table and modified new data table have at least the following characteristics:

(i) substantially each reference in an entry in said old data table that is different than corresponding entry in said new data table due to delete/insert modifications that form part of the transition between said old data table and new data table are reflected as invariant references in the corresponding entries in said modified old and modified new data tables;

(c) generating said compact difference result utilizing at least said modified new data table and modified old data table.

The invention provides for a system for performing an update in an old data table so as to generate a new data table; each data table including reference entries that contain reference that refer to other entries in the data table; the system comprising a processing device capable of:

(a) receiving data that includes a compact difference result; said compact difference result was generated utilizing a modified old data table and a modified new data table;

(b) generating a modified old data table utilizing at least said old data table;

(c) reconstituting a modified new data table utilizing directly or indirectly at least said modified old data table and said compact difference result; said modified old data table and modified new data table have at least the following characteristics:

(i) substantially each reference in an entry in said old data table that is different than corresponding entry in said new data table due to deleted/inset modifications that form part of the transition between said old data table and new data table are reflected as invariant references in the corresponding entries in said modified old and modified new data tables;

(d) reconstituting said new data table utilizing directly or indirectly at least said compact difference result and said modified new data table.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

Figure 1:
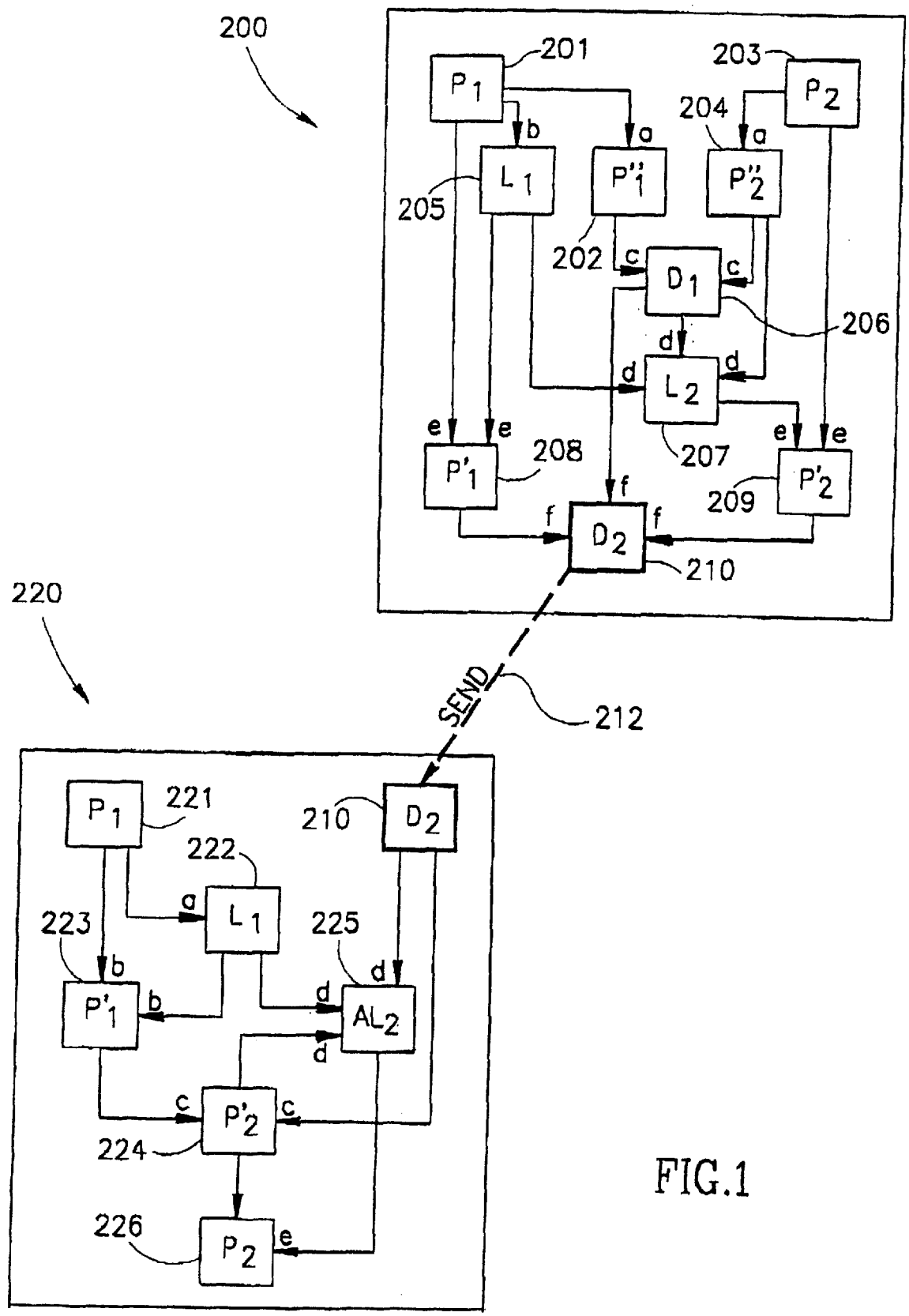
FIG. 1 is a schematic illustration of a sequence of operation according to one embodiment of the invention.
Figure 2A:
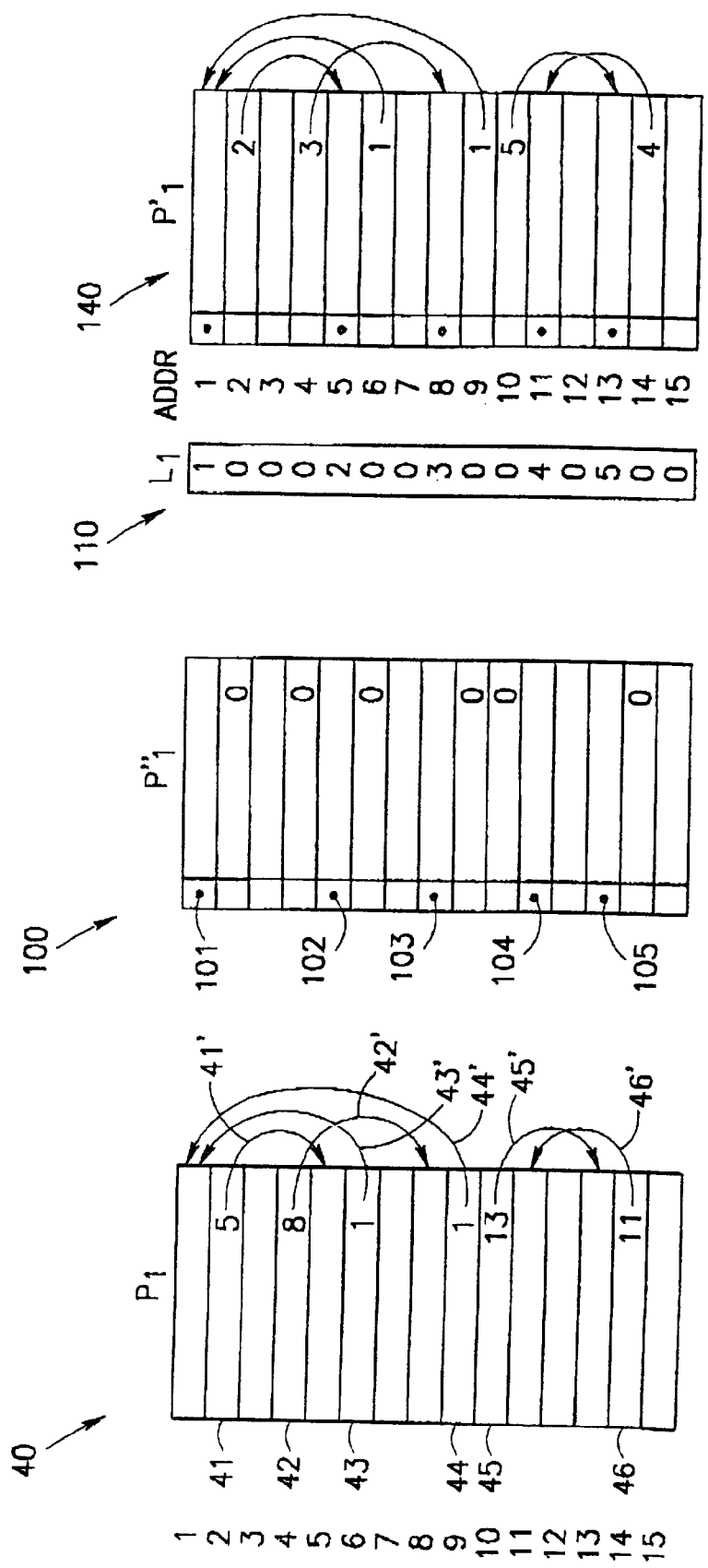
FIG. 2 shows exemplary old and new programs and the various interim results that are obtained by applying the sequence of operation of FIG. 1.
Figure 2B:
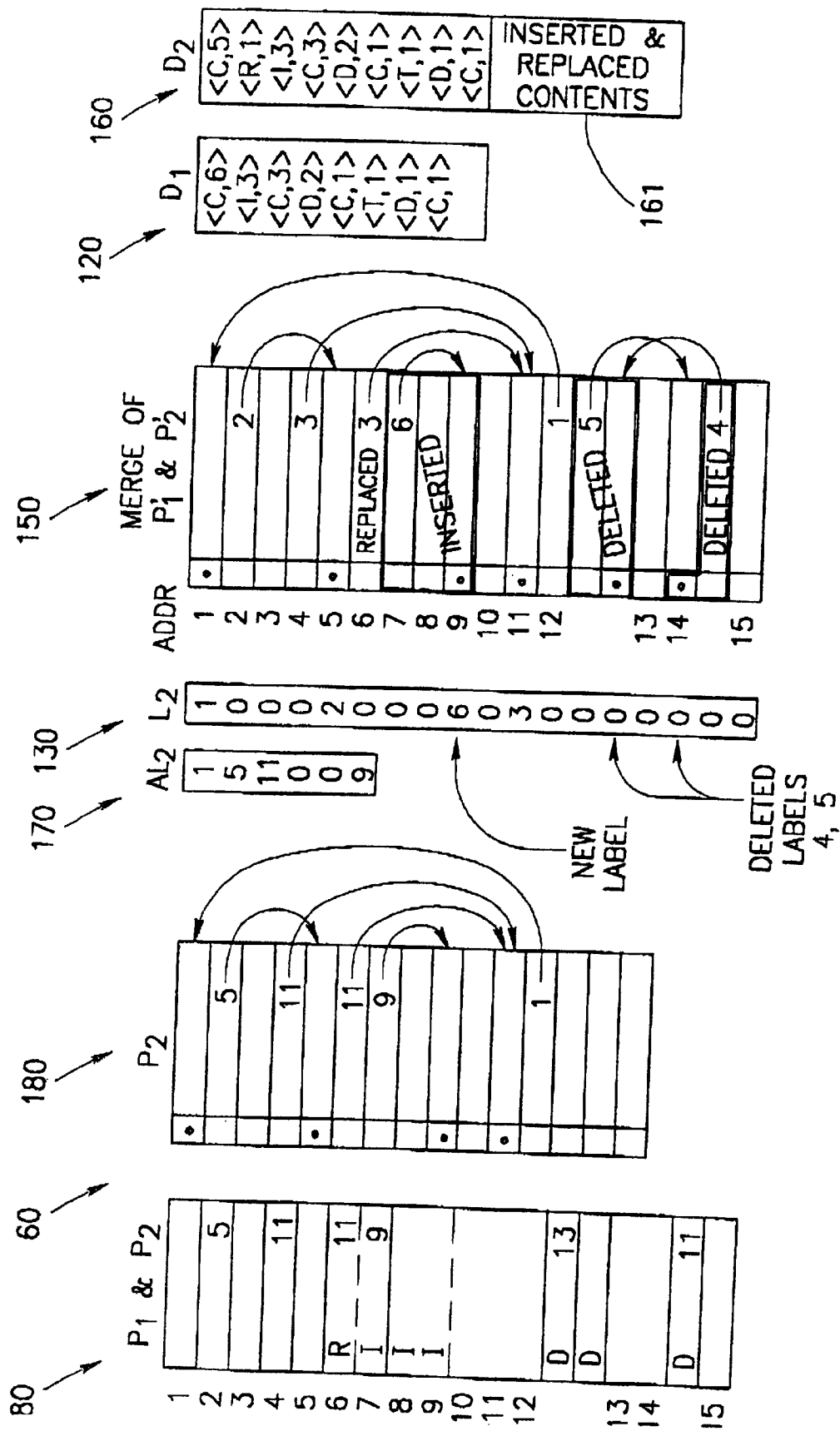

In FIG. 1, module (10) represents the sequence of operations performed e.g. at the provider site, for generating the difference result according to one embodiment of the invention. The sequence of operation will now be described with reference to exemplary old and new programs (FIG. 2). It should be noted that the specified sequence of operations may be carried out at any known per se platform including, but not limited to, a conventional P.C., a computer network, etc., all as known per se.

Thus, $P_1$ stands for the old program that includes entries (41), (42), (43), (44), (45) and (46) that contain references to entries 5,8,1,1,13, and 11 respectively, (as indicated by arrows (41') to (46').

$P_2$ stands for the new program which was generated (or could have been generated) by the sequence of modifications as depicted in the imaginary memory table (80). Said sequence of modifications (either real or imaginary), constitutes a transition sequence between $P_1$ and $P_2$.

As shown in entry no. 6, the reference to address '1' was replaced ('R' stands for replaced) by reference to address '11', e.g. due to a patch introduced by the programmer. Following the 6th entry, 3 new entries were inserted ('I' stands for inserted). The newly inserted entries reside at addresses 7 to 9. The next three entries which originally resided in addresses 7 and 9 at $P_1$ are now shifted (due to the 3 inserted entries) to addresses 10 to 12 in $P_2$.

Next, entries 10 and 11 in $P_1$ were deleted (D), and are therefore not assigned with any address at $P_2$. Entries 12 and 13 in $P_1$ remain intact and reside in addresses 13 and 14 in $P_2$. Entry 14 in $P_1$ was deleted (D) and it is marked as such (with no address) in the memory table (80). Lastly, entry (15) remains intact and therefore resides in entry 15 in $P_2$.

Having reviewed the sequence of modifications that constitute the transition from $P_1$ to $P_2$, there follows a brief review on how the specified modifications affected the reference entries of $P_1$ and $P_2$.

Thus, and as expected, the reference 5 in entry 2 remains intact and it will therefore not appear in the difference result between, $P_1$ and $P_2$.

The reference 8 in entry 4 of $P_1$ is flow modified by reference 11 in entry 4 of $P_2$. The modification in the reference (from 8 to 11) in entry 4 is caused by the insertion of entries 7 to 9 in $P_2$, which obviously shifted entry 8 (in $P_1$) to entry 11 (in $P_2$). Before proceeding any further, it should be noted that applying conventional file difference application to $P_1$ and $P_2$ will obviously reflect that entry 4 has been changed since the reference 8 has been changed to 11. Those versed in the art will readily appreciate that according to the invention, it is desired to neutralize this change, since it has occurred solely due to the fact that other entries have been affected (i.e. entries 7 to 9). It is accordingly an object of the invention to give rise to a situation where modifications of this kind will be modified to invariant references with the obvious consequence that they are not reflected in the difference result, thereby keeping the latter relatively compact.

Reverting now to the example of FIG. 2, the next reference 1 resides in entry 6 of $P_1$. As recalled, this entry was intentionally modified to 11, and as expected in entry 6 of $P_2$, contains reference 11. Unlike the previous reference modification which stems from shifts in the program and which therefore should be neutralized from appearing in the difference results, the current modification is applied to the entry under question (i.e. the reference in entry 6 has been changed from 1 to 11) and should be reflected in the difference result. Turning now to entry 7 of $P_2$, it forms part of the inserted entries, and therefore reference 9 thereof is obviously not reflected in $P_1$. Of course, since entry 7 has been inserted, it is expected to appear in the difference results.

Entry 10, with its associated reference 13, has been deleted from $P_1$, and as expected, it does not appear in $P_2$ and should, of course, be indicated in the difference results as an entry for deletion.

Entry 9 with its associated reference 1 in $P_1$, corresponds to entry 12 in $P_2$. Since the reference in entry 12 remains 1, it will not appear in the difference result.

Turing to the last reference entry 14 in $P_1$, it does not appear in $P_2$ (since it was deleted), and therefore it is expected to appear in the difference result as an entry for deletion.

Having described in general the differences between $P_1$ and $P_2$, as well as their effect on the difference result, attention is now directed also to FIG. 1 for describing one non-limiting realization of a system and method of the invention for accomplishing the desired difference result.

By this particular embodiment, the desired invariant references are accomplished by generating modified old and new programs wherein address references in entries are replaced by label marks as follows:

a) Create $P''_1$ table from $P_1$ (steps (201) and (202) in FIG. 1) and $P''_2$ table from $P_2$ (steps (203) and (204) in, FIG. 1) by adding label marks and replacing references in entries with some fixed values. As shown in FIG. 2, $P''_1$ is generated from $P_1$ by adding label marks to entries 1, 5, 8, 11 and 13 (designated (101) to (105), respectively). As also shown in FIG. 2, the references at entries 2, 4, 6, 9 10 and 14 were set to a fixed value and by this particular example 0. Although not shown in FIG. 2, $P''_2$ is generated in a similar manner;

b) Create a translation table $L_1$ (step (205) in FIG. 1) between entry references in $P_1$ and label distinct values. Thus, and as shown in FIG. 1 (110), a distinct label number is assigned to each label mark of $P''_1$. By this particular example, the distinct labels are assigned in ascending order and, as shown, labels marks (101) to (105) are assigned with the respective values 1 to 5;

c) $P''_1$ and $P''_2$ are compared giving rise to difference table $D_1$ (206) using file difference utilities of the kind specified above. As shown in FIG. 2, $D_1$ (120) contains list of entries each having the structure of <X, n>, where X stands for C (copy), I (insert), D(delete), or T (Toggle) and n stands for the number of instructions. $D_1$ includes, in fact, a list of instructions for generating $P''_2$ from $P''_1$. By this particular example, $D_1$ includes the following entries: <C,6> which signifies that the first 6 entries of $P''_1$ should be copied to $P''_2$. Note that whilst the $6^{th}$ entry is different in $P_1$ and $P_2$ (i.e. the reference has been changed from 1 to 11), this entry is the same in $P''_1$ and $P''_2$, since both references were set to 0 and, accordingly, the $6^{th}$ entry forms part of the copied part. The next entry <I,3>, signifies that three new entries should be inserted, and this accounts for the new three entries 7 to 9 that were inserted to $P_2$ (and are also reflected in $P''_2$). The next entry <C,3> stands for the three entries that reside in addresses 7 to 9 in, $P''_1$ (and $P_1$), and are shifted (without affecting their contents), to addresses 10 to 12 in $P''_2$ (and $P_2$). The next entry <D, 2> stands for the two entries (10 and 11) that were deleted from $P_1$ (and obviously also from $P''_1$). The next entry <C,1> stands for the entry 12 in $P''_1$ that was shifted (without affecting its contents) to entry 13 in $P''_2$. The next entry <T,1> is a special entry indicating that a change has occurred in the label of entry 13 of $P''_1$, i.e,. it was removed in the corresponding entry 14 in $P''_2$ for the simple reason that the entry that refers to this label was deleted (entry 10 in $P''_1$ (and $P_1$). <T,1> signifies, thus, that the entry 13 should be copied (to entry 14), whilst deleting the label mark. Next, <D,,1> stands for the deleted entry (14) in $P''_1$, and <C,1> stands for copying the last intact entry that is to be copied from $P''_1$ to $P''_2$ (entry 15).

d) Analyzing $D_1$ to determine the Position and size of deleted or inserted program fragments and apply equivalent changes to $L_1$ translation table to create $L_2$ translation table (207), which translates entry references in $P_2$ to their distinct label value in the following manner: For a non-inserted referred entry perform:

$L_2$[entry address]=$L_1$[matching entry address in $P_1$] (hereinafter the first condition)

For an inserted referred entry, perform:

$L_2$[entry address]=U( ) different than any value in $L_1$; U( ) signifies a label generation function for generating distinct labels (hereinafter the second condition). The function is of repeatable nature, namely, when activated in the same scenario it will always generate the same result. The latter characteristics will be clarified when the subsequent program reconstruction phase is described below.

The resulting $L_2$ table (130) is shown in FIG. 2. Thus, the first six instructions fall in the first condition (i.e. non inserted entry) and, accordingly, the distinct labels (1 and 2) are simply copied from $L_1$.

The next three entries are inserted and, accordingly, the second condition applies and U( ) is activated to generate a distinct label value. Since, as shown in $L_1$, five labels are "occupied", the next free one is 6 and, accordingly, the reference entry 9 is assigned with the value 6. Those versed in the art will readily appreciate that whilst in this example U( ) generates the distinct label values by simply incrementing the last occupied value by 1, this is only an example.

Turning now to the next three entries, <C,3>, the reference entry 11 falls in the first criterion and, accordingly, the label value (3) is taken from $L_1$.

The next entry in $D_1$ <D,2> is ignored, since it concerns two deleted entries.

The next entry, <C,1>, has no reference entry and therefore need not be processed for generating $L_2$.

The next entry, <T,1> corresponds to the deleted label (from entry 13 in $L_1$) and in this respect, is resembles the previous delete modification that is ignored.

The last two entries, <D,1> and <C,1>, do not involve reference entries and therefore need not be processed for the purpose of generating $L_2$.

e) Create $P'_1$ (208) and $P'_2$ (209) for $P_1$ and $P_2$ respectively, by replacing entry references with their translated values using $L_1$ and $L_2$ tables and by coping label marks from $P''_1$ and $P''_2$.

Step (e) will be described with reference to $P'_1$ and applies mutatis mutandis also to $P'_2$ (see 150 in FIG. 2). Thus, the label marks (101) to (105) of $P''_1$ are copied to the respective locations in $P'_1$ (140 in, FIG. 2). Next, the reference entries of $P_1$ are replaced by their corresponding label marks as retrieved from $L_1$. More specifically, the reference 5 in entry 2 of $P_1$ is replaced by the corresponding label from $L_1$. As shown, label 2 resides in, entry 5 of $L_1$ and, accordingly, the reference in entry 2 in $P'_1$ is set to 2.

In a similar manner, the reference 8 in entry 4 of $P_1$ is replaced by label number 3 according to the label number (3) that resides in entry 8 of $L_1$. In a similar manner, the references 1,1,13 and 11 of entries 6, 14 of $P_1$ are replaced by respective label numbers 1,1,5 and 4.

f) Having generated $P'_1$ and $P'_2$, the final difference result $D_2$ is generated. To this end, $D_1$ is analyzed to determine the position of program fragments copied from $P_1$ to $P_2$ (i.e. in the example of FIG. 2, the entries that fall in <C, x> or <T,x> commands; the <I, x> <D,x> commands are ignored>). For copied entries as derived from $D_1$, $P'_1$ and $P'_2$ are compared so as to generate $D_2$ (210) in the following manner:

f1) take each pair of matching entries in $P'_1$ and $P'_2$ (neither deleted nor inserted) that contain a (replaced) reference, and compare their replaced reference values. In the case of discrepancy, add a special modification command to reflect the difference.

f2) attach all the inserted program fragments and replaced values. These fragments are taken from $P'_2$, thus they contain label marks, and address references remain under $L_2$ translation.

Step (f) will now be exemplified with reference to the specific example of FIG. 2. As recalled, only entries that fall in a <C,x> command are of interest for the f1 step analysis. Thus, the first non-inserted entry of $D_1$, i.e. <C,6> is analyzed. According to step f1, only the $six^{th}$ entry contains a replaced reference (reference 1 in $P'_1$ as compared to reference 3 in $P'_2$). Accordingly, The first command of $D_1$ <C,6> is replaced in $D_2$ by <C,5> and a correction command <R,1> standing for "replace label in entry 6" is added to $D_2$. Entries 2 and 4 in $P'_1$ (that also fall in the first six entries and are encompassed by the <C,6> command), contain the respective references 2 and 3, exactly as the corresponding entries in $P'_2$ and, accordingly, no correction command is required.

The rest of the entries that correspond to <C,3> <C,1> commands do not include replaced references in $P'_1$ and $P'_2$ and, accordingly, no replacement command is required.

Step f2 simply stipulates that the inserted data and replaced data (replaced reference) will be appended to $D_2$ in order for the reconstructing party to be able to reconstitute $P_2$ from $D_2$ and $P_1$. Thus the three entries (that should be inserted to entries 7 to 9 in $P_2$) and which correspond to <I,3> in $D_2$, are added to $D_2$ in section (161). Likewise the replaced reference 3 (instead of 1) in the six$^{th}$ entry which corresponds to <R,1> in $D_2$ is added to $D_2$, in section (161).

Depending upon the particular application, $D_2$ may be stored on a storage medium, or transmitted through a communication network (212 in FIG. 2), all as required and appropriate.

There follows a description for a typical sequence of operations (220) for reconstructing $P_2$ from $P_1$ and the so received $D_2$, according to the present embodiment. Reconstructing $P_2$ may also be realized on any desired platform, all as required and appropriate. A sequence of operation, according to this embodiment includes:

a) Generate $L_1$ (222) from $P_1$ (221); (see step b above in 200)

b) Generate $P'_1$ (223) from $P_1$ and $L_1$; (see step e above in 200)

c) Generate $P'_2$ (224) from $P_1'$ and $D_2$ (210) by applying the modification commands of $D_2$ on $P'_1$;

d) Analyze the so received $D_2$ difference result to determine the position and size of copied program fragments of $P_1$ and use $L_1$ to create $AL_2$ (225 in FIG. 1), which translates the label enumeration values appearing in $P'_2$, back to their original address reference in the following manner:

For a non-inserted referred address:

$AL_2[L_1[\text{matching address in } P'_1]] = \text{address}$ (first condition)

For an inserted referred address:

$AL_2[U(\ )] = \text{address}$ (second condition)

Step (d) will now be exemplified with reference to the specific example of FIG. 2. Thus, in order to generate $AL_2$ (170), at first $L_2$ (130) is reconstructed, using to this end $L_1$, $P'_2$ and $D_2$ all of which are available at the reconstruction side (220). Having reconstructed $L_2$, $AL_2$ can be easily derived by reversing $L_2$. More specifically, entry 1 in $L_2$ holds the value 1 and accordingly, entry 1 of $AL_2$ holds the value 1. Entry 5 of $L_2$ holds the value 5 and accordingly, entry 2 in $AL_2$ holds the value 5. By following the same reverse logic, entry 9 of $L_2$ holds the value 6 and accordingly entry 6 of $AL_2$ holds the value 9 and lastly by following the same logic entry 3 of $AL_2$ holds the value 11.

e) Lastly, $P_2$ (226) is reconstructed from $P'_2$ (224) and $AL_2$ (225) by translating address references in $P'_2$ from label enumeration values back to the original address references using $AL_2$.

Step (e) will now be exemplified with reference to the specific example of FIG. 2. Thus, in order to reconstruct $P_2$ (180), the label references in $P'_2$ are translated according to $AL_2$. More specifically, label reference 2 in entry 2 of $P'_2$ is replaced by actual entry reference 5 in $P_2$ according to the value 5 in entry #2 of $AL_2$. Likewise, label references 3 in entries 4 and 6 of $P'_2$, are replaced by actual address reference 11 in $P_2$, according to the value 11 in entry #3 of $AL_2$. In a similar manner, label references 1 in entry 12 of $P'_2$ is replaced by actual address reference 1 in $P_2$ according to the value 1 in entry #1 of $AL_2$. Lastly, label reference 6 in entry 7 of $P'_2$, is replaced by actual address reference 9 in $P_2$, according to the value 9 in entry #6 of $AL_2$. As shown by this particular example, $P_2$ was generated indirectly from the difference result data $D_2$, by the intermediary data structure, $AL_2$.

Entries 4 and 5 of $AL_2$ hold the value 0, signifying that reference labels 4 and 5 need not be updated in $P_2$, since they form, part of entries in $P_1$ that were deleted.

Those versed in the art will readily appreciate that whilst the invention has been described with reference to a specific application of updating software through a communication network, the invention is by no means bound by this specific application. Thus, by way of another example, the invention is applicable for efficient version control. Consider, for example, a series of program versions $P_1$ $P_2$ and $P_3$. Applying the technique of the invention gives rise to compact $D_{12}$ and $D_{23}$, which stand for the difference between $P_1$ $P_2$ and $P_2$ $P_3$, respectively. The resulting compact $D_{12}$ and $D_{23}$ as compared to conventional, larger in size, difference results, bring about the desired efficient version control tool. Other applications are, of course, feasible, all as required and appropriate.

Having described the invention with reference to a specific application of extraction differences between old and new versions of computer programs, there follows a description with reference to a more generalized representation of data table depicted in the form of a graph.

Before turning to the specific example, few observations which apply to the data table representation are set forth below:

The graph represents a collection of data-records interconnected by references which enable to access them.

Data records are stored in a linear storage such as array according to a pre-defined order.

The amount of storage allocated for storing the references is not negligible.

The data that represents the references is not held as a contiguous block, but rather is dispersed among other items of the data table (e.g. among the data records).

Figure 3A:
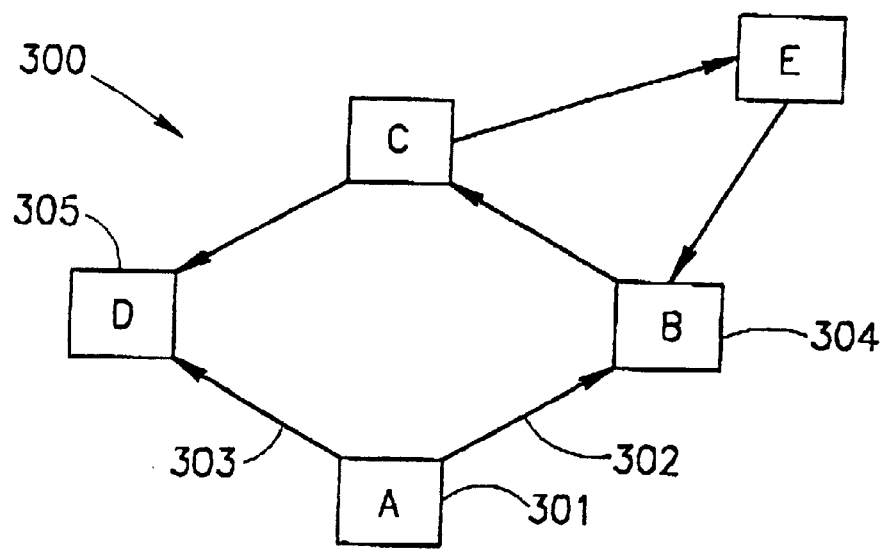
FIG. 3 is an exemplary data table, presented in the form of graph which is subject to difference extraction in accordance with the invention.

Bearing this in mind, attention is directed to FIG. 3A. The graph (300) represents an (old version of an) abstract data structure in the form of a graph (which is applicable in many applications as will be explained in greater details below). The nodes A–E represent data-records and the links represent references to other data-records. In this example, the pre-defined order for the data records is an alphabetical sort of records' names. The storage of the graph would appear as:

1. A, 2, 4
2. B, 3
3. C, 4, 5
4. D
5. E, 2

Thus, for example, data-record A (301), having address 1, is linked by means of links (302 and 303) that stand for references 2 and 4 respectively, to data-records B ad D (304 and 305). As shown above, B and D reside in addresses 2 and 4 respectively.

Figure 3B:
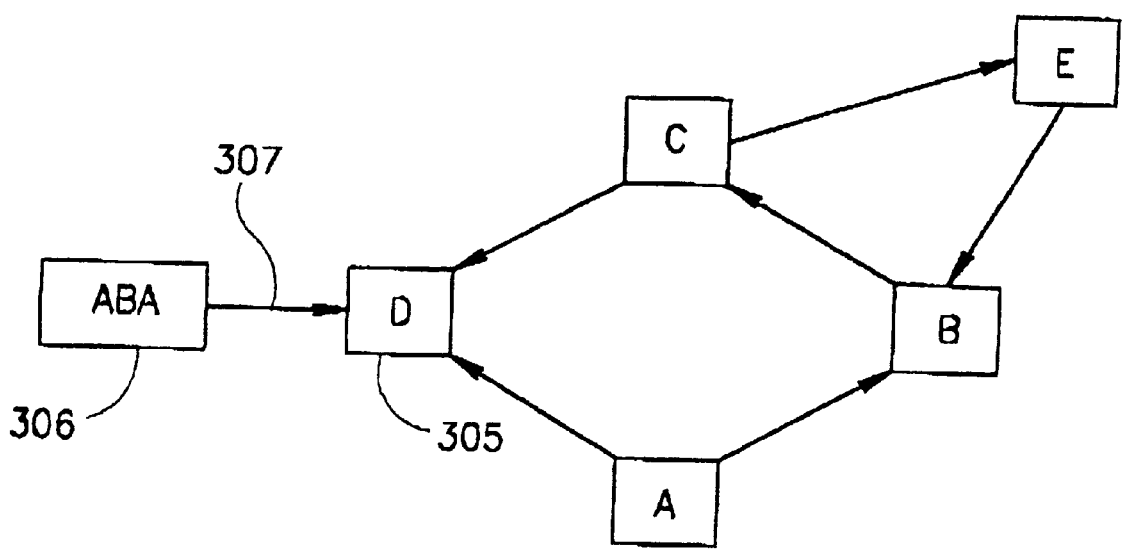

Should it now be required to modify the above graph by adding a data-record named ABA (306 in FIG. 3B) that is linked by means of link (307) to data-record D (305), this would bring about the following new graph storage, where ABA is inserted in accordance with the said alphabetical order:

1. A, 3, 5
2. ABA, 5
3. B, 4,
4. C, 5, 6
5. D
6. E, 3

It is accordingly appreciated that insertion of only one data-record gave rise to fairly large differences between the storage of the old and the storage of the new graphs.

It is readily appreciated that the above abstract data structure is similar to a computer program, except for the fact that in the specified data structure, alphabetical order is imposed as compared to a computer program, where the order of execution is imposed.

Accordingly, applying the technique described in detail with reference to FIGS. 1 and 2 above would give rise to an extraction of compact differences.

As specified above, the data table is by no means bound to the representation of a computer program. Thus, by way of non-limiting example, the specified graph (300) represents a map where nodes stand for cities and links for roads linking the various cities. The technique of the invention would allow for compact representation of topographical modification in the map (e.g. in response to the construction of a new road between the City having the symbol ABA and the city having the symbol D).

By way of another non-limiting example, the specified graph represents electronic circuitry where the nodes stand for the components and the links stand for the wiring connections between the components.

Numbers, alphabetic characters and roman symbols that appear in the following claims are designated for convenience of explanations only, and do not necessarily imply the particular order of the steps.

The invention has been described with a certain degree of particularity, but those versed in the art will readily appreciate that various alterations and modifications may be carried out without departing from the spirit and scope of the following Claims:

What is claimed is:

1. A method for generating a compact difference result between an old executable program and a new executable program; each program including reference entries that contain reference that refer to other entries in the program; the method comprising the steps of:
   (a) scanning the old program and for substantially each reference entry perform steps that include:
      (i) replacing the reference of said entry by a distinct label mark, whereby a modified old program is generated;
   (b) scanning the new program and for substantially each reference entry perform steps that include:
      (i) replacing the reference of said entry by a distinct label mark, whereby a modified new program is generated;
   (c) generating said difference result utilizing directly or indirectly at least said modified old program and modified new program.

2. The method of claim 1, further comprising the step of:
   (d) transmitting said compact difference result over a communication network.

3. The method of claim 2, wherein said network includes the Internet.

4. The method of claim 1, further comprising the step of:
   (d) storing said compact difference result on a storage medium.

5. A method for performing an update in an old executable program so as to generate a new executable program; each program including reference entries that contain reference that refer to other entries in the program; the method comprising the steps of:
   (a) receiving data that includes a compact difference result; said compact difference result was generated utilizing a modified old program and a modified new program;
   (b) scanning the old program and for substantially each reference entry perform steps that include:
      (i) replacing the reference of said entry by a distinct label mark, whereby the modified old program is generated;
   (c) reconstituting the modified new program utilizing at least said compact difference result and said modified old program; said modified new program is differed from said new program at least in that substantially each reference entry in said new program is replaced in said modified new program by a distinct label mark;
   (d) reconstituting said new program utilizing directly or indirectly at least said compact difference result and said modified new program.

6. The method of claim 5, wherein said data is received in step (a) from a remote site through a network.

7. The method of claim 6, wherein said network includes the Internet.

8. A method for generating a compact difference result between an old executable program and a new executable program; each program including reference entries that contain reference that refer to other entries in the program; the method comprising the steps of:
   (a) generating a modified old program utilizing at least said old program;
   (b) generating a modified new program utilizing at least said new program, said modified old program and modified new program have at least the following characteristics:
      (i) substantially each reference in an entry in said old program that is different than corresponding entry in said new program due to delete/insert modifications that form part of the transition between said old program and new program are reflected as invariant references in the corresponding entries in said modified old and modified new programs;
   (c) generating said compact difference result utilizing at least said modified new program and modified old program.

9. The method of claim 8, further comprising the step of:
   (d) transmitting said compact difference result over a communication network.

10. The method of claim 9, wherein said network includes the Internet.

11. The method of claim 8, further comprising the step of:
    (d) storing said compact difference result on a storage medium.

12. A method for performing an update in an old executable program so as to generate a new executable program; each program including reference entries that contain reference that refer to other entries in the program; the method comprising the steps of:
    (a) receiving data that includes a compact difference result; said compact difference result was generated utilizing a modified old program and a modified new program;
    (b) generating a modified old program utilizing at least said old program;
    (c) reconstituting a modified new program utilizing directly or indirectly at least said modified old program and said compact difference result; said modified old program and modified new program have at least the following characteristics:
       (i) substantially each reference in an entry in said old program that is different than corresponding entry in said new program due to delete/inset modifications that form part of the transition between said old program and new program are reflected as invariant references in the corresponding entries in said modified old and modified new programs;
(d) reconstituting said new program utilizing directly or indirectly at least said compact difference result and said modified new program.

13. The method of claim 5, wherein said data is received in step (a) from a storage medium.

14. A system for generating a compact difference result between an old executable program and a new executable program; each program including reference entries that contain reference that refer to other entries in the program; the system comprising a processing device capable of:
(a) scanning the old program and for substantially each reference entry perform steps that include:
   (i) replacing the reference of said entry by a distinct label mark, whereby a modified old program is generated;
(b) scanning the new program and for substantially each reference entry perform steps that include:
   (i) replacing the reference of said entry by a distinct label mark, whereby a modified new program is generated;
(c) generating said difference result utilizing directly or indirectly at least said modified old program and modified new program.

15. The system of claim 14, wherein said processor device is further capable of transmitting said compact difference result over a communication network.

16. The system of claim 15, wherein said network includes the Internet.

17. The system of claim 14, wherein said processor device is further capable of storing said compact difference result on a storage medium.

18. A system for performing an update in an old executable program so as to generate a new executable program; each program including reference entries that contain reference that refer to other entries in the program; the system comprising a processing device capable of:
(a) receiving data that includes a compact difference result; said compact difference result was generated utilizing a modified old program and a modified new program;
(b) scanning the old program and for substantially each reference entry perform steps that include:
   (i) replacing the reference of said entry by a distinct label mark, whereby the modified old program is generated;
(c) reconstituting the modified new program utilizing at least said compact difference result and said modified old program; said modified new program is differed from said new program at least in that substantially each reference entry in said new program is replaced in said modified new program by a distinct label mark;
(d) reconstituting said new program utilizing directly or indirectly at least said compact difference result and said modified new program.

19. The system of claim 18, wherein said data is received from a remote site through a network.

20. The system of claim 19, wherein said network includes the Internet.

21. A system for generating a compact difference result between an old executable program and a new executable program; each program including reference entries that contain reference that refer to other entries in the program; the system comprising a processing device capable of:
(a) generating a modified old program utilizing at least said old program;
(b) generating a modified new program utilizing at least said new program, said modified old program and modified new program have at least the following characteristics:
   (i) substantially each reference in an entry in said old program that is different than corresponding entry in said new program due to delete/insert modifications that form part of the transition between said old program and new program are reflected as invariant references in the corresponding entries in said modified old and modified new programs;
(c) generating said compact difference result utilizing at least said modified new program and modified old program.

22. The system of claim 21, wherein said processor is further capable of transmitting said compact difference result over a communication network.

23. The system of claim 22, wherein said network includes the Internet.

24. The system of claim 21, wherein said processor is further capable of storing said compact difference result on a storage medium.

25. A system for performing an update in an old executable program so as to generate a new executable program; each program including reference entries that contain reference that refer to other entries in the program; the system comprising a processing device capable of:
(a) receiving data that includes a compact difference result; said compact difference result was generated utilizing a modified old program and a modified new program;
(b) generating a modified old program utilizing at least said old program;
(c) reconstituting a modified new program utilizing directly or indirectly at least said modified old program and said compact difference result; said modified old program and modified new programs have at least the following characteristics:
   (i) substantially each reference in an entry in said old program that is different than corresponding entry in said new program due to delete/inset modifications that form part of the transition between said old program and new program are reflected as invariant references in the corresponding entries in said modified old and modified new programs;
(d) reconstituting said new program utilizing directly or indirectly at least said compact difference result and said modified new program.

26. The system of claim 18, wherein said data is received in step (a) from a storage medium.

27. A processing device having associated therewith a storage medium which holds compact difference result data that was generated by the method of anyone of claims 1 to 4.

28. A processing device having associated therewith a storage medium which holds compact difference result data that was generated by the method of anyone of claims 8 to 11.

29. The method of claim 12, wherein said data is received in step (a) from a remote site through a network.

30. The method of claim 29, wherein said network includes the Internet.

31. The method of claim 12, wherein said data is received in step (a) from a storage medium.

32. The system of claim 25, wherein said data is received in step (a) from a remote site through a network.

33. The system of claim 32, wherein said network includes the Internet.

34. The system of claim 25, wherein said data is received in step (a) from a storage medium.

35. A method for generating a compact difference result between an old data table and a new data table; each data table including reference entries that contain reference that refer to other entries in the data table; the method comprising the steps of:
   (a) scanning the old data table and for substantially each reference entry perform steps that include:
      (i) replacing the reference of said entry by a distinct label mark, whereby a modified old data table is generated;
   (b) scanning the new data table and for substantially each reference entry perform steps that include:
      (i) replacing the reference of said entry by a distinct label mark, whereby a modified new data table is generated;
   (c) generating said difference result utilizing directly or indirectly at least said modified old data table and modified new data table.

36. The method of claim 35, further comprising the step of:
   (d) transmitting said compact difference result over a communication network.

37. The method of claim 36, wherein said network includes the Internet.

38. The method of claim 35, further comprising the step of:
   (d) storing said compact difference result on a storage medium.

39. A method for performing an update in an old data table so as to generate a new data table; each data table including reference entries that contain reference that refer to other entries in the data table; the method comprising the steps of:
   (a) receiving data that includes a compact difference result; said compact difference result was generated utilizing a modified old data table and a modified new data table;
   (b) scanning the old data table and for substantially each reference entry perform steps that include:
      (i) replacing the reference of said entry by a distinct label mark, whereby the modified old data table is generated;
   (c) reconstituting the modified new data table utilizing at least said compact difference result and said modified old data table; said modified new data table is differed from said new data table at least in that substantially each reference entry in said new data table is replaced in said modified new data table by a distinct label mark;
   (d) reconstituting said new data table utilizing directly or indirectly at least said compact difference result and said modified new data table.

40. The method of claim 39, wherein said data is received in step (a) from a remote site through a network.

41. The method of claim 40, wherein said network includes the Internet.

42. A method for generating a compact difference result between an old data table and a new data table; each data table including reference entries that contain reference that refer to other entries in the data table; the method comprising the steps of:
   (a) generating a modified old data table utilizing at least said old data table; (b) generating a modified new data table utilizing at least said new data table, said modified old data table and modified new data table have at least the following characteristics:
      (i) substantially each reference in an entry in said old data table that is different than corresponding entry in said new data table due to delete/insert modifications that form part of the transition between said old data table and new data table are reflected as invariant references in the corresponding entries in said modified old and modified new data tables;
   (c) generating said compact difference result utilizing at least said modified new data table and modified old data table.

43. The method of claim 42, further comprising the step of:
   (d) transmitting said compact difference result over a communication network.

44. The method of claim 43, wherein said network includes the Internet.

45. The method of claim 42, further comprising the step of:
   (d) storing said compact difference result on a storage medium.

46. A method for performing an update in an old data table so as to generate a new data table; each data table including reference entries that contain reference that refer to other entries in the data table; the method comprising the steps of:
   (a) receiving data that includes a compact difference result; said compact difference result was generated utilizing a modified old data table and a modified new data table;
   (b) generating a modified old data table utilizing at least said old data table;
   (c) reconstituting a modified new data table utilizing directly or indirectly at least said modified old data table and said compact difference result; said modified old data table and modified new data table have at least the following characteristics:
      (i) substantially each reference in an entry in said old data table that is different than corresponding entry in said new data table due to delete/inset modifications that form part of the transition between said old data table and new data table are reflected as invariant references in the corresponding entries in said modified old and modified new data tables;
   (d) reconstituting said new data table utilizing directly or indirectly at least said compact difference result and said modified new data table.

47. The method of claim 39, wherein said data is received in step (a) from a storage medium.

48. A system for generating a compact difference result between an old data table and a new data table; each data table including reference entries that contain reference that refer to other entries in the data table; the system comprising a processing device capable of:
   (a) scanning the old data table and for substantially each reference entry perform steps that include:
      (i) replacing the reference of said entry by a distinct label mark, whereby a modified old data table is generated;
   (b) scanning the new data table and for substantially each reference entry perform steps that include:
      (i) replacing the reference of said entry by a distinct label mark, whereby a modified new data table is generated;

(c) generating said difference result utilizing directly or indirectly at least said modified old data table and modified new data table.

49. The system of claim 48, wherein said processor device is further capable of transmitting said compact difference result over a communication network.

50. The system of claim 49, wherein said network includes the Internet.

51. The system of claim 48, wherein said processor device is further capable of storing said compact difference result on a storage medium.

52. A system for performing an update in an old data table so as to generate a new data table; each data table including reference entries that contain reference that refer to other entries in the data table; the system comprising a processing device capable of:
   (a) receiving data that includes a compact difference result; said compact difference result was generated utilizing a modified old data table and a modified new data table;
   (b) scanning the old data table and for substantially each reference entry perform steps that include:
      (i) replacing the reference of said entry by a distinct label mark, whereby the modified old data table is generated;
   (c) reconstituting the modified new data table utilizing at least said compact difference result and said modified old data table; said modified new data table is differed from said new data table at least in that substantially each reference entry in said new data table is replaced in said modified new data table by a distinct label mark;
   (d) reconstituting said new data table utilizing directly or indirectly at least said compact difference result and said modified new data table.

53. The system of claim 52, wherein said data is received from a remote site through a network.

54. The system of claim 53, wherein said network includes the Internet.

55. A system for generating a compact difference result between an old data table and a new data table; each data table including reference entries that contain reference that refer to other entries in the data table; the system comprising a processing device capable of:
   (a) generating a modified old data table utilizing at least said old data table;
   (b) generating a modified new data table utilizing at least said new data table, said modified old data table and modified new data table have at least the following characteristics:
      (i) substantially each reference in an entry in said old data table that is different than corresponding entry in said new data table due to delete/insert modifications that form part of the transition between said old data table and new data table are reflected as invariant references in the corresponding entries in said modified old and modified new data tables;
   (c) generating said compact difference result utilizing at least said modified new data table and modified old data table.

56. The system of claim 55, wherein said processor is further capable of transmitting said compact difference result over a communication network.

57. The system of claim 56, wherein said network includes the Internet.

58. The system of claim 55, wherein said processor is further capable of storing said compact difference result on a storage medium.

59. A system for performing an update in an old data table so as to generate a new data table; each data table including reference entries that contain reference that refer to other entries in the data table; the system comprising a processing device capable of:
   (a) receiving data that includes a compact difference result; said compact difference result was generated utilizing a modified old data table and a modified new data table;
   (b) generating a modified old data table utilizing at least said old data table;
   (c) reconstituting a modified new data table utilizing directly or indirectly at least said modified old data table and said compact difference result; said modified old data table and modified new data table have at least the following characteristics:
      (i) substantially each reference in an entry in said old data table that is different than corresponding entry in said new data table due to delete/inset modifications that form part of the transition between said old data table and new data table are reflected as invariant references in the corresponding entries in said modified old and modified new data tables;
   (d) reconstituting said new data table utilizing directly or indirectly at least said compact difference result and said modified new data table.

60. The system of claim 59, wherein said data is received in step (a) from a storage medium.

61. A processing device having associated therewith a storage medium which holds compact difference result data that was generated by the method of anyone of claims 35 to 38.

62. A processing device having associated therewith a storage medium which holds compact difference result data that was generated by the method of anyone of claims 42 to 45.

63. The method of claim 46, wherein said data is received in step (a) from a remote site through a network.

64. The method of claim 63, wherein said network includes the Internet.

65. The method of claim 46, wherein said data is received in step (a) from a storage medium.

66. The system of claim 59, wherein said data is received in step (a) from a remote site through a network.

67. The system of claim 66, wherein said network includes the Internet.

68. The system of claim 59, wherein said data is received in step (a) from a storage medium.

* * * * *

(12) EX PARTE REEXAMINATION CERTIFICATE (8029th)
United States Patent
Peleg

(10) Number: US 6,546,552 C1
(45) Certificate Issued: Feb. 15, 2011

(54) DIFFERENCE EXTRACTION BETWEEN TWO VERSIONS OF DATA-TABLES CONTAINING INTRA-REFERENCES

(75) Inventor: Sharon Peleg, Ramat Hasharon (IL)

(73) Assignee: Red Bend Ltd., Hod Hasharon (IL)

Reexamination Request:
No. 90/009,670, Jan. 22, 2010

Reexamination Certificate for:
Patent No.: 6,546,552
Issued: Apr. 8, 2003
Appl. No.: 09/376,512
Filed: Aug. 18, 1999

(51) Int. Cl.
*G06F 9/45* (2006.01)
*G06F 9/44* (2006.01)

(52) U.S. Cl. ........................................................ 717/170
(58) Field of Classification Search .................. 717/170
See application file for complete search history.

(56) References Cited

U.S. PATENT DOCUMENTS

| | | |
|---|---|---|
| 3,969,723 A | 7/1976 | Kennicott |
| 4,115,853 A | 9/1978 | Dummermuth |
| 4,278,837 A | 7/1981 | Best |
| 4,319,079 A | 3/1982 | Best |
| 4,425,618 A | 1/1984 | Bishop et al. |
| 4,464,650 A | 8/1984 | Eastman et al. |
| 4,465,901 A | 8/1984 | Best |
| 4,542,453 A | 9/1985 | Patrick et al. |
| 4,683,549 A | 7/1987 | Takaki |
| 4,807,182 A | 2/1989 | Queen |
| 4,831,517 A | 5/1989 | Crouse et al. |
| 4,972,504 A | 11/1990 | Daniel, Jr. et al. |
| 4,987,550 A | 1/1991 | Leonard et al. |
| 5,043,871 A | 8/1991 | Nishigaki et al. |
| 5,051,745 A | 9/1991 | Katz |
| 5,146,221 A | 9/1992 | Whiting et al. |
| 5,155,847 A | 10/1992 | Kirouac et al. |
| 5,170,465 A | 12/1992 | McKeeman et al. |
| 5,204,960 A | 4/1993 | Smith et al. |
| 5,210,854 A | 5/1993 | Beaverton et al. |

(Continued)

FOREIGN PATENT DOCUMENTS

| | | |
|---|---|---|
| EP | 0 411 232 | 2/1991 |
| EP | 0 546 684 | 6/1993 |
| EP | 0 702 299 | 3/1995 |
| EP | 0 665 496 | 8/1995 |
| EP | 0 695 040 | 1/1996 |
| EP | 0 752 794 A3 | 12/1999 |
| EP | 1 014 263 | 6/2000 |
| EP | 1 087 533 | 3/2001 |
| EP | 0 723 226 B1 | 5/2001 |
| EP | 0 813 167 | 10/2003 |

(Continued)

OTHER PUBLICATIONS

Ajila, Samuel, "Software Maintenance: An Approach to Impact Analysis of Objects Change", Software—Practice and Experience, Oct. 1995, vol. 25, pp. 1155–1181, John Wiley & Sons, Ltd., United Kingdom.

(Continued)

*Primary Examiner*—Andrew L Nalven

(57) ABSTRACT

A method for generating a compact difference result between an old program and a new program. Each program including reference entries that contain reference that refer to other entries in the program. The method includes the steps of scanning the old program and for each reference entry perform steps that include replacing the reference of the entry by a distinct label mark, whereby a modified old program is generated. There is further provided the step of scanning the new program and for each reference entry perform steps that include replacing the reference of the entry by a distinct label mark, whereby a modified new program is generated. There is still further provided the step of generating the specified difference result utilizing directly or indirectly the modified old program and modified new program.

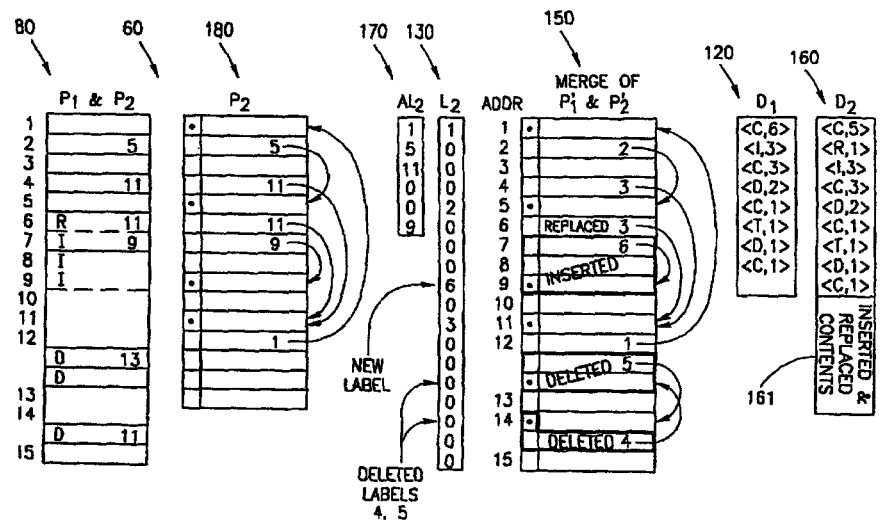

U.S. PATENT DOCUMENTS

| | | |
|---|---|---|
| 5,247,660 A | 9/1993 | Ashcraft et al. |
| 5,260,693 A | 11/1993 | Horsley |
| 5,307,492 A | 4/1994 | Benson |
| 5,319,645 A | 6/1994 | Bassi et al. |
| 5,347,653 A | 9/1994 | Flynn et al. |
| 5,357,629 A | 10/1994 | Dinnis et al. |
| 5,392,390 A | 2/1995 | Crozier |
| 5,410,703 A | 4/1995 | Nilsson et al. |
| 5,450,589 A | 9/1995 | Maebayashi et al. |
| 5,465,258 A | 11/1995 | Adams |
| 5,473,772 A | 12/1995 | Halliwell et al. |
| 5,479,654 A | 12/1995 | Squibb |
| 5,481,713 A | 1/1996 | Wetmore et al. |
| 5,491,821 A | 2/1996 | Kilis |
| 5,493,674 A | 2/1996 | Mizutani et al. |
| 5,502,439 A | 3/1996 | Berlin |
| 5,546,586 A | 8/1996 | Wetmore et al. |
| 5,574,573 A | 11/1996 | Ray et al. |
| 5,574,898 A | 11/1996 | Leblang et al. |
| 5,574,906 A | 11/1996 | Morris |
| 5,581,697 A | 12/1996 | Gramlich et al. |
| 5,581,768 A | 12/1996 | Garney et al. |
| 5,588,143 A | 12/1996 | Stupek, Jr. et al. |
| 5,600,834 A | 2/1997 | Howard |
| 5,619,698 A | 4/1997 | Lillich et al. |
| 5,630,072 A | 5/1997 | Dobbins |
| 5,634,052 A | 5/1997 | Morris |
| 5,636,366 A | 6/1997 | Robinson et al. |
| 5,659,755 A | 8/1997 | Strohacker |
| 5,675,802 A | 10/1997 | Allen et al. |
| 5,675,803 A | 10/1997 | Preisler et al. |
| 5,694,566 A | 12/1997 | Nagae |
| 5,699,275 A | 12/1997 | Beasley et al. |
| 5,732,275 A | 3/1998 | Kullick et al. |
| 5,745,058 A | 4/1998 | Auerbach et al. |
| 5,745,906 A | 4/1998 | Squibb |
| 5,752,039 A | 5/1998 | Tanimura |
| 5,757,690 A | 5/1998 | McMahon |
| 5,764,987 A | 6/1998 | Eidt et al. |
| 5,764,994 A | 6/1998 | Craft |
| 5,790,796 A | 8/1998 | Sadowsky |
| 5,790,856 A | 8/1998 | Lillich |
| 5,790,860 A | 8/1998 | Wetmore et al. |
| 5,794,254 A | 8/1998 | McClain |
| 5,799,144 A | 8/1998 | Mio |
| 5,802,549 A | 9/1998 | Goyal et al. |
| 5,805,899 A | 9/1998 | Evans et al. |
| 5,813,017 A | 9/1998 | Morris |
| 5,815,714 A | 9/1998 | Shridhar et al. |
| 5,829,001 A | 10/1998 | Li et al. |
| 5,832,520 A | 11/1998 | Miller |
| 5,835,701 A | 11/1998 | Hastings |
| 5,837,986 A | 11/1998 | Barile et al. |
| 5,838,264 A | 11/1998 | Cooper |
| 5,844,508 A | 12/1998 | Murashita et al. |
| 5,848,274 A | 12/1998 | Hamby et al. |
| 5,873,097 A | 2/1999 | Harris et al. |
| 5,884,094 A | 3/1999 | Begun et al. |
| 5,886,991 A | 3/1999 | Guarneri et al. |
| 5,889,995 A | 3/1999 | Segnan |
| 5,893,113 A | 4/1999 | McGrath et al. |
| 5,897,633 A | 4/1999 | Nolan |
| 5,901,225 A | 5/1999 | Ireton et al. |
| 5,938,766 A | 8/1999 | Anderson et al. |
| 5,953,534 A | 9/1999 | Romer et al. |
| 5,956,479 A | 9/1999 | McInerney et al. |
| 5,958,048 A | 9/1999 | Babaian et al. |
| 5,960,189 A | 9/1999 | Stupek, Jr. et al. |
| 5,964,873 A | 10/1999 | Choi |
| 5,966,541 A | 10/1999 | Agarwal |
| 5,974,254 A | 10/1999 | Hsu |
| 5,978,791 A | 11/1999 | Farber et al. |
| 5,982,937 A | 11/1999 | Accad |
| 5,983,000 A | 11/1999 | Perron |
| 5,990,810 A | 11/1999 | Williams |
| 5,995,754 A | 11/1999 | Holzle et al. |
| 6,006,328 A | 12/1999 | Drake |
| 6,009,261 A | 12/1999 | Scalzi et al. |
| 6,018,349 A | 1/2000 | Szeliski et al. |
| 6,018,747 A | 1/2000 | Burns et al. |
| 6,026,235 A | 2/2000 | Shaughnessy |
| 6,052,531 A | 4/2000 | Waldin, Jr. et al. |
| 6,071,004 A | 6/2000 | Le Gall et al. |
| 6,071,317 A | 6/2000 | Nagel |
| 6,076,134 A | 6/2000 | Nagae |
| 6,077,311 A | 6/2000 | Lichtenstein et al. |
| 6,078,931 A | 6/2000 | Motoyama |
| 6,112,025 A | 8/2000 | Mulchandani et al. |
| 6,115,550 A | 9/2000 | Hunter et al. |
| 6,122,731 A | 9/2000 | Son |
| 6,141,698 A | 10/2000 | Krishnan et al. |
| 6,163,780 A | 12/2000 | Ross |
| 6,163,811 A | 12/2000 | Porter |
| 6,167,407 A | 12/2000 | Nachenberg et al. |
| 6,175,663 B1 | 1/2001 | Huang |
| 6,189,145 B1 | 2/2001 | Bellin, Jr. et al. |
| 6,192,157 B1 | 2/2001 | Prebble |
| 6,192,475 B1 | 2/2001 | Wallace |
| 6,202,208 B1 | 3/2001 | Holiday, Jr. |
| 6,216,175 B1 | 4/2001 | Sliger et al. |
| 6,216,213 B1 | 4/2001 | Breternitz, Jr. et al. |
| 6,230,316 B1 | 5/2001 | Nachenberg |
| 6,240,550 B1 | 5/2001 | Nathan et al. |
| 6,243,766 B1 | 6/2001 | Sliger et al. |
| 6,253,317 B1 | 6/2001 | Knapp, III et al. |
| 6,260,157 B1 | 7/2001 | Schurecht et al. |
| 6,263,497 B1 | 7/2001 | Maeda et al. |
| 6,282,698 B1 | 8/2001 | Baker et al. |
| 6,282,709 B1 | 8/2001 | Reha et al. |
| 6,289,358 B1 | 9/2001 | Mattis et al. |
| 6,289,509 B1 | 9/2001 | Kryloff |
| 6,292,880 B1 | 9/2001 | Mattis et al. |
| 6,295,644 B1 | 9/2001 | Hsu et al. |
| 6,298,481 B1 | 10/2001 | Kosaka et al. |
| 6,305,010 B2 | 10/2001 | Agarwal |
| 6,317,754 B1 | 11/2001 | Peng |
| 6,330,574 B1 | 12/2001 | Murashita |
| 6,330,712 B1 | 12/2001 | Iwaya |
| 6,334,213 B1 | 12/2001 | Li |
| 6,349,407 B1 | 2/2002 | Towfiq |
| 6,360,363 B1 | 3/2002 | Moser et al. |
| 6,374,250 B2 | 4/2002 | Ajtai et al. |
| 6,389,592 B1 | 5/2002 | Ayres et al. |
| 6,397,385 B1 | 5/2002 | Kravitz |
| 6,404,923 B1 | 6/2002 | Chaddha |
| 6,421,679 B1 | 7/2002 | Chang et al. |
| 6,425,125 B1 | 7/2002 | Fries et al. |
| 6,430,685 B1 | 8/2002 | Yu et al. |
| 6,434,695 B1 | 8/2002 | Esfahani et al. |
| 6,438,621 B1 | 8/2002 | Kanamori et al. |
| 6,438,748 B1 | 8/2002 | Gard et al. |
| 6,463,582 B1 | 10/2002 | Lethin et al. |
| 6,466,999 B1 | 10/2002 | Sliger et al. |
| 6,496,974 B1 | 12/2002 | Sliger et al. |
| 6,510,552 B1 | 1/2003 | Benayoun et al. |
| 6,526,574 B1 | 2/2003 | Jones |
| 6,532,588 B1 | 3/2003 | Porter |
| 6,594,822 B1 | 7/2003 | Schweitz et al. |
| 6,610,103 B2 | 8/2003 | Ehrman et al. |
| 6,618,747 B1 | 9/2003 | Flynn et al. |
| 6,629,123 B1 | 9/2003 | Hunt |

| | | | |
|---|---|---|---|
| 6,643,506 | B1 | 11/2003 | Criss et al. |
| 6,643,775 | B1 | 11/2003 | Granger et al. |
| 6,651,249 | B2 | 11/2003 | Waldin et al. |
| 6,691,305 | B1 | 2/2004 | Henkel et al. |
| 6,738,799 | B2 | 5/2004 | Dickenson |
| 6,754,848 | B1 | 6/2004 | Froehlich et al. |
| 6,757,893 | B1 | 6/2004 | Haikin |
| 6,760,907 | B2 | 7/2004 | Shaylor |
| 6,804,663 | B1 | 10/2004 | Delo |
| 6,952,823 | B2 | 10/2005 | Kryloff et al. |
| 7,203,708 | B2 | 4/2007 | Liu et al. |
| 7,542,758 | B2 | 6/2009 | Rajaram et al. |
| 7,587,433 | B2 | 9/2009 | Peleg et al. |
| 2002/0087500 | A1 | 7/2002 | Berkowitz et al. |
| 2002/0100036 | A1 | 7/2002 | Moshir et al. |
| 2003/0163508 | A1 | 8/2003 | Goodman |
| 2003/0163805 | A1 | 8/2003 | Hata et al. |
| 2003/0217257 | A1 | 11/2003 | Ebsen et al. |
| 2004/0063899 | A1 | 4/2004 | Gustafson et al. |
| 2004/0078793 | A1 | 4/2004 | Bragulla et al. |
| 2005/0132359 | A1 | 6/2005 | McGuire et al. |
| 2005/0257206 | A1 | 11/2005 | Semerdzhiev |
| 2006/0004756 | A1 | 1/2006 | Peleg et al. |
| 2007/0255764 | A1 | 11/2007 | Sonnier et al. |

FOREIGN PATENT DOCUMENTS

| | | |
|---|---|---|
| GB | 2 330 428 | 4/1999 |
| JP | 59-201150 | 11/1984 |
| JP | 63-208941 | 8/1988 |
| JP | 63-208941 A | 8/1988 |
| JP | 404242829 A | 8/1992 |
| JP | 5091550 A | 4/1993 |
| JP | 05-120067 | 5/1993 |
| JP | 06-314194 | 11/1994 |
| JP | 09-069042 | 3/1997 |
| JP | 10-003383 | 1/1998 |
| JP | 11-126161 | 5/1999 |
| WO | WO 98/54639 | 12/1981 |
| WO | WO 96/32679 | 10/1996 |
| WO | WO 97/43711 | 11/1997 |
| WO | WO 99/54816 | 10/1999 |
| WO | WO 00/34861 | 6/2000 |
| WO | WO 2004/063899 A3 | 7/2004 |
| WO | WO 2004/063899 A2 | 7/2004 |
| WO | WO 2005/024628 A3 | 3/2005 |
| WO | WO 2005/024628 A2 | 3/2005 |

OTHER PUBLICATIONS

Ajmani, Sameer, "A Review of Software Upgrade Techniques for Distributed Systems", MIT Computer Science and Artificial Intelligence Laboratory, Aug. 7, 2002, pp. 1–19, Cambridge, MA.

Baker, Brenda, "A Program for Identifying Duplicated Code", Computing Science and Statistics, 24th Symposium, Mar. 18–21, 1992, vol. 24, 9 pages, College Station, TX.

Baker et al., "Compressing Differences of Executable Code", ACM SIGPLAN Workshop on Compiler Support for System Software (WCSSS), Apr. 22, 1999, pp. 1–10, Atlanta, GA.

Bartoletti et al., "Secure Software Distribution System", Proceedings of the 20th National Information Systems Security Conference, Jun. 18, 1997, 11 pages, Baltimore, MD.

Bashar et al., "Low–Threat Security Patches and Tools", Proceedings of the International Conference on Software Maintenance, Nov. 30, 1996, 23 pages, IEEE Computer Society, Washington, DC.

Burns, Randal C., "Differential Compression: A Generalized Solution for Binary Files", Dec. 1996, pp. 1–69, University of California, Santa Cruz, CA.

Burns et al., "In–Place Reconstruction of Delta Compressed Files", Proceedings of the Seventeenth Annual Symposium on Principles of Distributed Computing, 1998, pp. 267–275, Puerto Vallarta, Mexico.

Chambers et al., "A User Designed Software System for Electron Microprobes—Basic Premises and the Control Program", Journal de Physique, Feb. 1984, pp. 223–226, vol. 45, No. 2, Les Editions de Physique, Les Ulis, France.

Cheung et al., "Optimal Routing Table Design for IP Address Lookups Under Memory Constraints", IEEE Proceedings of INFOCOM, Mar. 1999, 8 pages, New York, NY.

Church et al., "Dotplot: a Program for Exploring Self–Similarity in Millions of Lines of Text and Code", Jun. 1993), Journal of Computational and Graphical Statistics, vol. 2, No. 2, 12 pages, American Statistical Association, Alexandria, VA.

Cifuentes et al., "Decompilation of Binary Programs", Software—Practice and Experience, Jul. 1995, vol. 25 (7), pp. 811–829, John Wiley & Sons, Ltd., United Kingdom.

Cifuentes, Cristina, "Reverse Compilation Techniques", Queensland University of Technology, Jul. 1994, pp. 1–342.

Clodfelter et al., "Technological Profile of Shopping Centers: Present and Future Use", Journal of Shopping Center Research, Spring/Summer 1996, pp. 59–93, International Council of Shopping Centers Educational Foundation, New York, NY.

Cook et al., "A Methodology for Cost–Effective Analysis of In–Place Software Processes", IEEE Transaction on Software Engineering, Jan. 1997, pp. 1–25.

Coppieters, Kris, "A Cross–Platform Binary Diff", Dr. Dobb's Journal, May 1, 1995, 5 pages, Miller Freeman, Inc., San Mateo, CA.

Duntemann, Jeff, Assembly Language: Step–by–Step, pp. 1–469, 1992, John Wiley & Sons, Inc., New York, NY.

Eastwood, David B., "Information Technology and Fresh Produce: A Case Study Using Store Level Scan Data to Analyze Sales", Jul. 1997, 20 pages, University of Minnesota, St. Paul, MN.

Engler, Dawson R., "VCODE: A Retargetable, Extensible, Very Fast Dynamic Code Generation System", May 1996, SIGPLAM Conference on Programming Language Design and Implementation, 11 pages, ACM Press, Philadelphia, PA.

Flake, Halvar, "Structural Comparison of Executable Objects", Proceedings of the IEEE Conference on Detection of Intrusions and Malware & Vulnerability Assessment, 2004, pp. 161–173, Dartmund, Germany.

Fraser et al., "A Machine–Independent Linker", Software—Practice and Experience, Department of Computer Science, The University of Arizona, 1982, vol. 12, pp. 351–366, United Kingdom.

Gosling et al., "The Java Language Environment", May 1996, pp. 1–98, Sun Microsystems, Mountain View, CA.

Gray, Robert M., "Fundamentals of Data Compression", IEEE Proceedings of International Conference on Information, Communications, and Signal Processing, Sep. 9, 1997, pp. 1–186, Singapore.

International Search Report mailed Mar. 25, 2010, International Application No. PCT/IL2009/000762.

International Search Report mailed Feb. 15, 2010, International Application No. PCT/IL2009/000754.

International Search Report mailed Feb. 15, 2010, International Application No. PCT/IL2009/000755.

International Business Machines Corporation, "Method for permitting severat versions of a module to coexist within a virtual machine", Mar. 1, 2001, 8 pages, vol. 443, No. 177, Mason Publications, Hampshire, Great Britain.

Mogul et al., "Potential benefit of delta encoding and data compression for HTTP", Proceedings of SIGCOMM '97, Sep. 1997, pp. 14 pages, ACM, New York, NY.

Munch, Bjorn, "Versioning in a Software Engineering Database—the Change Oriented Way", Division of Computer Systems and Telematics, The Norwegian Institute of Technology, Sep. 17, 1993, pp. 1–284, Germany.

Mycroft et al., "Optimising compilation, Part I: classical imperative languages", Proceedings of SOFSEM, 1992, pp. 1–17, Czechoslovakia.

Nilsen, Kelvin, "Issues in the Design and Implementation of Real–Time Java", Jul. 19, 1996, pp. 1–28, SYS–CON Media, Montvale, NJ.

Oplinger et al., "Software and Hardware for Exploiting Speculative Parallelism with a Multiprocessor", Stanford University Computer Systems Laboratory, Feb. 1997, pp. 1–23, Stanford, CA.

Oreizy, Peyman, "Decentralized Software Evolution", Proceednngs of the International Conference on the Principles of Software Evolution, Apr. 20–21, 1998, pp. 1–5, ACM, New York, NY.

"PKZIP 6.0 for Windows Getting Started Manual", Copyright 2002 PKWARE, Inc., 13 pages, Milwaukee, WI.

Pandey et al., "Providing Fine–Grained Access Control for Mobile Programs Through Binary Editing", pp. 1–22, Technical Report TR98–08, 1998, University of California, Davis, CA.

Pellegrini et al., "Efficient IP Table Lookup via Adaptive Stratified Trees with Selective Reconstruction", Lecture Notes in Computer Science, Sep. 2004, pp. 1–26, Springer Berlin, Germany.

Roth et al., "Database Compression", Sigmod Record, Sep. 1993, vol. 22, No. 3, pp. 31–39, ACM, New York, NY.

Saha et al., "Symbolic Support Graph: A Space Efficient Data Structure for Incremental Tabled Evaluation", Department of Computer Science, Lectures Notes in Computer Science, Oct. 10, 2005, vol. 3668, pp. 1–15, Springer, Germany.

Stevens, Curt, "Knowledge–Based Assistant for Accessing Large, Poorly Structured Information Spaces", Thesis Submitted to the Faculty of the Graduate School of the University of Colorado, 1993, 125 pages, Boulder, CO.

Tichy, Walter F., "RCS—A System for Version Control", Department of Computer Sciences, Purdue University, 1985, vol. 15, pp. 1–19, Wiley, United Kingdom.

Tichy, Walter F., "The String–to–String Correction Problem with Block Moves", Purdue University, Oct. 26, 1983, 16 pages, ACM, New York, NY.

Tsou et al., "Client–Server Components and Metadata Objects for Distributed Georgraphic Information Services", Proceedings of the GIS/LIS, 1998, pp. 590–599, Association of American Geography, Washington, DC.

Wang et al., BMAT—A Binary Matching Tool, Microsoft Research Technical Report, Nov. 15, 1999, pp. 1–11, Microsoft Corporation, Redmond, WA.

Wolfe et al., "Executing Compressed Programs on an Embedded RISC Architecture", 1992, pp. 81–91, IEEE, Computer Society Press, Los Alamitos, CA.

Zeller, Andreas, "Configuration Management with Version Sets", A Unified Software Versioning Model and its Applications, Apr. 1, 1997, pp. 1–320, Technische Universitat Braunschweig, Germany.

Gryder et al., "Survey of Data Compression Techniques", Martin Marietta Energy Systems, Inc. for the United States of Energy, Sep. 1991, 45 pages, Oak Ridge, TN.

Hardy et al., "Essence: A Resource Discovery System Based on Semantic File Indexing", Proceedings of the USENIX Winter Conference, Jan. 25–29, 1993, pp. 361–374.

Hirschberg, Daniel S., "Algorithms for the Longest Common Subsequence Problem", Journal of the ACM, Oct. 1997, vol. 24, No. 4, pp. 664–675, ACM, New York, NY.

Horwitz, Susan, "Identifying the Semantic and Textual Differences Between Two Versions of a Program", Proceedings of the ACM SIGPLAN 1990 Conference on Programming Language Design and Implementation, 1990, pp. 234–246, ACM, New York, NY.

Hoshi et al., "Software Updated System Using Wireless Communication", NTT DoCoMo Technical Journal, 2004, vol. 5, No. 4, pp. 36–43, Japan.

Hung et al., "UNIX Code Management and Distribution", Sep. 1992, pp. 1–4, Stanford Linear Accelerator Center, Stanford, CA.

Hunt et al., "Delta Algorithms: An Empirical Analysis", ACM Transactions on Software Engineering and Methodology, Apr. 1998, vol. 7, No. 2, pp. 192–214, ACM, New York, NY, ACM, New York, NY.

Hunt et al., "An Algorithm for Differential File Comparison", Department of Electrical Engineering, Stanford University, Computing Sciences Technology Report No. 41, Jun. 1976, pp. 1–9, Bell Laboratories, Murray Hill, NJ.

Keller et al., "Binary Component Adaptation", Computing Sciences Technology Report No. ECOOP '98 Proceedings, Lecture Notes on Computer Science, Proceedings of the 12th European Conference on Object–Oriented Programming, 1998, vol. 1445, pp. 1–17.

Kifer, Michael, "Ediff User's Manual", Version 2.70, Mar. 1998, pp. 1–44.

Kishan et al., "Dynamic Kernel Modification and Extensibility", Technical Report of the SUIF Group, Department of Computer Science, 2002, 26 pages; Stanford University, Stanford, CA.

Larus et al., "Rewriting Executable Files to Measure Program Behavior", Software, University of Wisconsin—Madison, Mar. 25, 1992, vol. 24, pp. 1–17, Wiley Interscience, United Kingdom.

Larus et al., "Rewriting Executable Files to Measure Program Behavior", University of Wisconsin—Madison, Oct. 24, 1994, pp. 1–23.

Lefurgy, Charles Robert, "Efficient Execution of Compressed Programs", Dissertation, 2000, pp. 1–212, University of Michigan, Ann Arbor, MI.

Lefurgy et al., "Improving Code Density Using Compression Techniques", Proceedings of the 30th Annual International Sysposium on Microarchitectur, Micro–30, Dec. 1–3, 1997, pp. 10 pages, ACM, New York, NY.

Lefurgy, Charles Robert, "Space–efficient Executable Program Representations for Embedded Microprocessors", Thesis, 1998, pp. 1–48, Ann Arbor, MI.

Lekatsas et al., "Code Compression for Embedded Systems", Proceedings fo the 35th Design Automation Conference, 1998, Jun. 1998, 6 pages, San Francisco, CA.

Lynch et al., "Patch Graphs: an Efficient Data Structure for Completion of Finitely Presented Groups", Proceedings of the 3rd International AISMC Conference, Lecture Notes in Computer Science, 1996, vol. 1138, 15 pages, Springer Verlag, United Kingdom.

MacDonald et al., "PRCS: The Project Revision Control System", Lecture Notes in Computer Science, 1998, vol. 1439, 14 pages, University of California at Berkeley, National Energy Research Scientific Computing Center, Springer Verlag, United Kingdom.

MacKenzie et al., "Comparing and Merging Files", diff, diff3, sdiff, cmp, and patch, Edition 2.8, for diffutils 2.8 and patch 2.5.4, Mar. 23, 2002, pp. 1–100, Free Software foundation Ltd., Boston, MA.

Microsoft PressPass, News Press Release, May 14, 1997, 2 pages, Microsoft Corp., Redmond, WA2 pages.

Miller et al., "A File Comparison Program", Software—Practice and Experience, Nov. 1985, vol. 15 (11), pp. 1025–1040, Wiley Interscience, United Kingdom.

Japanese Office Action dated Nov. 28, 2006, with translation.

Houlder et al., "XOR Commands on SCSI Disk Drives", Seagate Technology, pp. 1–30.

Hunt et al., "An Empirical Study of Delta Algorithm's", University of Karlsruhe and AT&T Research, pp. 49–65.

IBM Corp., "Logging Status Information While Installing New Software", Jun. 1991, vol. 34, No. 1, one page.

Batalden et al., IBM Technical Disclosure Bulletin, "Maintainable ROS Code Through The Combination of ROM and EEPROM," 32(9A); 273–276, (1990).

Coppieters. "A Cross–Platform Binary Diff", Dr. Dobb's Journal, 34–36, May 1995.

James J. Hunt et al., "Distributed Configuration Management via Java and the World Wide Web", University of Karlsruhe, Germany.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-68 is confirmed.

* * * * *